United States Patent [19]

Hardwick

[11] Patent Number: 5,271,546
[45] Date of Patent: Dec. 21, 1993

[54] METHOD FOR PRODUCING CLAD METAL PLATE

[75] Inventor: Roy Hardwick, Troon, Scotland

[73] Assignee: Imperial Chemical Industries, PLC, Millbank, England

[21] Appl. No.: 956,292

[22] Filed: Oct. 5, 1992

[30] Foreign Application Priority Data

Oct. 4, 1991 [GB] United Kingdom ............... 9121147

[51] Int. Cl.⁵ .................. B23K 20/04; B23K 20/08
[52] U.S. Cl. ......................... 228/107; 228/175; 228/265
[58] Field of Search ............. 228/107, 235, 175, 265

[56] References Cited

U.S. PATENT DOCUMENTS

2,366,168  1/1945  Bakarian .................... 228/263.17

FOREIGN PATENT DOCUMENTS

867575  4/1971  Canada ........................ 228/175
8600766  10/1987  Netherlands ............... 228/107

OTHER PUBLICATIONS

"Explosion Welding", *Metals Handbook*, 9th Ed., vol. 6, ASM, Metals Park, Ohio, 1983, p. 713.
J. R. Birchfield, "Big Boom Bonds ...", *Welding Design and Fabrication*, Jun. 1982, pp. 78-83.

*Primary Examiner*—Mark Rosenbaum
*Assistant Examiner*—Jeffrey T. Knapp
*Attorney, Agent, or Firm*—Cushman, Darby & Cushman

[57] ABSTRACT

Clad metal plate comprising a layer of cladding metal bonded to a first substrate metal layer is produced by a method comprising initially metallurgically bonding a thin layer of substrate to a thick layer of cladding metal and bonding further layers of substrate metal to the first substrate layer in at least two roll bonding steps wherein the cladding layer is reduced to the desired thickness. The initial metallurgical bonding step may advantageously be a bonding method such as explosive bonding which is free from metal compatibility restrictions encountered in roll-bonding. The method enables a base metal such as carbon steel to be clad economically with a metal, for example titanium, with which it is incompatible for roll-bonding.

10 Claims, 1 Drawing Sheet

METHOD FOR PRODUCING CLAD METAL PLATE

This invention relates to a method for producing clad metal plate comprising a substrate of a first metal bonded to a cladding layer of a second metal. The invention is particularly advantageous for producing clad plates having a substrate of relatively inexpensive metal with a veneer of more corrosion resistant metal.

There is a considerable requirement for clad plate, particularly in the chemical industry, for the fabrication of apparatus exposed to corrosive chemicals. The use of the clad metal effects substantial reduction in the cost of such apparatus.

The predominant method for the production of clad plate is hot roll-bonding and this method provides adequate bonding quality for much of the potential usage of clad plate. However, the quality of bonding depends upon the degree of compatibility of the metals of the clad plate and some metal combinations are so incompatible that they cannot be roll-bonded. This incompatibility is usually greatest when the mechanical properties of the two materials differ greatly such that the two materials deform at significantly different rates when they are passed through the rolling mill. In this instance, the extension of the surfaces during rolling occurs at different rates and consequently, the two contacting surfaces move relative to each other and bonding cannot readily occur. Conversely, when the mechanical properties of the cladder and substrate materials are similar, they will deform at a similar rate during roll-bonding and the two contacting surfaces will extend in unison, avoiding relative movement between them, and bonding will occur as new areas of clean and non-oxidised metal are exposed by the surface extension.

A superior method of producing clad plate is by explosive bonding wherein a cladding plate is progressively propelled across a 'stand-off gap' against a metal substrate by means of a layer of high explosive detonating progressively in a plane parallel to the surface of the cladding plate. This explosive bonding method is well known and has been described, for example, in United Kingdom Specifications Nos. 932746, 1032019, 1168264 and 1248794. Explosive bonding is essentially free from compatibility problems and gives high quality bonded interfaces. It is, however, much more expensive than roll-bonding in those metal combinations which can be bonded by either process. Only limited areas of clad plate can be explosively bonded, the upper limit of the area possible varying and being defined by the cladder thickness; the thinner the cladder, the smaller the area which can be bonded. Because of these technical limitations and the economic factors the market for explosively clad plates is restricted. In order to reduce the cost of explosive bonding and overcome areal and/or thickness limitations, some manufacturers explosively bond a thick composite ingot using a relatively thick cladder, the thickness proportions of the cladder and substrate being equal to those of the final thickness proportions of the finished product. This clad ingot is then onward rolled to reduce the thickness and extend the area to the final required dimensions. The explosive bonding cost is thereby dissipated over the greater product area now yielded. This product is still more expensive than a comparable roll-bonded product because the bonding takes place at an intermediate stage of the manufacturing process and allows only a limited dissipation of the expensive explosive bonding cost. For technical and commercial reasons, therefore, this onward rolling route is usually reserved for materials which are incompatible for roll-bonding or where the initial composite ingot thickness required is so great that the composite pack for roll-bonding, (traditionally consisting of two such ingot assemblies one upon the other) would be of unacceptable thickness for the rolling mill. Consequently, the single composite ingots which are explosively bonded usually require the substrate to be thick, of large area and, consequently, heavy thus involving high transportation costs to the remote sites where cladding operations of this magnitude must be carried out. Similarly, to establish the cladder substrate thickness ratio required in the final product, the cladder must be also thick requiring large environmentally unacceptable explosive charges which are also expensive and time consuming to prepare. Additionally, the non-bond edge effects associated with thick cladders reduce the product area yielded from the bonding operation. All these factors are cumulative in increasing the cost of production of this onward rolled product.

An object of the present invention is the provision of an economical method for the production of clad metal plate which is not restricted by compatibility requirements.

In accordance with the invention a method of producing a clad metal plate comprises the steps of: metallurgically bonding a relatively thin first layer of substrate metal to a relatively thick layer (or ingot) of cladding metal to form a bonded composite element, the said thin layer being sufficiently thick to ensure that the flow characteristics at the free substrate metal surface of the bonded composite element are not significantly modified by the cladding metal; roll-bonding a relatively thick second layer of substrate metal to the free substrate metal surface of the bonded composite element to form a composite cladding element, the bonded composite element and the second layer of substrate metal being thinned and areally expanded in the roll-bonding step but leaving in the composite cladding element a sufficiently thick layer of substrate metal to ensure that the flow characteristics at the free substrate metal surface of the composite cladding element are not significantly modified by the cladding element; roll-bonding the free substrate metal surface of the composite cladding element to a relatively thick third layer of substrate metal to form a clad metal plate, the composite cladding element and the third layer of substrate metal being thinned and areally expanded in the roll-bonding step.

The composite cladding element produced by the first roll-bonding step is advantageously subdivided into a plurality of composite cladding elements which are used separately in the second roll-bonding step.

If the cladding metal layer is not reduced to the desired thickness in the second roll-bonding operation the clad plate may be subdivided and the substrate metal surface of each portion may be roll-bonded to a further layer of substrate metal, the composite being thinned and expanded as in the previous roll-bonding steps.

Thus each roll-bonding operation results in a thinning of the cladding layer and enhancement of the proportion of substrate metal. However at least two roll-bonding operations are required to obtain sufficient area of clad metal from a given area of the initial metallurgical bond to render the method economical.

The layers of substrate metal may be of the same composition or may differ in composition provided the layers are compatible for roll-bonding. The substrate metal may advantageously comprise, for example, low carbon steel or stainless steel and the cladding metal may comprise, for example, titanium, zirconium, nickel or nickel alloy. Low carbon steel may also advantageously be clad with stainless steel.

In some cases where the substrate metal is carbon steel the first layer of substrate metal may advantageously be steel of lower carbon content than that of the second substrate layer in order to limit migration of carbon from the substrate metal to the cladding metal.

The dimensions of the plate will be dictated by the capacity of the rolling mill used to produce the clad plate and further, by the advantageous practice of joining the surfaces to be roll-bonded by fusion welding the substrate layers by a peripheral fusion weld. Moreover, the thickness of substrate metal on the cladding metal before roll-bonding must be adequate to ensure that the surface flow behaviour during the roll-bonding steps is dictated by the mechanical properties of the substrate layer and not, as would be the case should the substrate layer be too thin, by the mechanical properties of the adjacent underlying cladder material. The minimum thickness of the substrate layer which is necessary to avoid any influence by the underlying cladder material during roll-bonding, will vary and be dictated by the differential in mechanical properties of the cladder and substrate materials; the greater the differential, the greater the minimum layer thickness required. In practice, however, a thickness of approximately 10 mm is adequate to preclude any influence by the cladding metal upon the behaviour of the substrate metal surface during roll-bonding even when the differential in mechanical properties is the maximum which can be anticipated from any metal combination normally bonded. Moreover, a 10 mm thick layer can be peripherally welded, can be bonded at the areal dimensions of the range of cladder ingot sizes normally bonded and is not sufficiently thick to cause non-bonded edge effects in an explosive bonding step or to require explosive loads for bonding which are environmentally unacceptable.

The metallurgical bonding of the layer of the first of substrate metal to the layer of cladding metal may be effected by an convenient bonding process. For example, some metal combinations may conveniently be bonded by electroplating or, in cases where the metals are compatible for welding in the molten state (although not compatible for roll-bonding), the second metal may be applied to the first metal by fusion bonding using weld overlay techniques. However, the method generally preferred is explosive welding wherein a layer of substrate metal is impelled by means of an overlying explosive charge against the cladding metal to bond the surfaces of the metals together. This explosive bonding method gives superior bond strength and is applicable to almost all combinations of substrate and cladding metals without being unduly restricted by compatibility requirements.

Accordingly the preferred procedure for producing clad metal plate comprises the steps of:

explosively bonding a first layer of substrate metal having a thickness of at least 10 mm to a relatively thicker coincident overlying layer of cladding metal to form a bonded composite element;

peripherally welding the substrate metal of the bonded composite element to a coincident relatively thicker second layer of substrate metal compatible for roll-bonding to said first layer to form a composite assembly;

heating the composite assembly to a temperature above bonding temperature of the said substrate metals;

passing the heated composite assembly through pressure rolls to bond the substrate metal surface of the explosively bonded composite element to the adjacent surface of the second layer of substrate metal and simultaneously expand the area and reduce the thickness of the metal layers thereby forming a roll-bonded composite cladding assembly having a layer of substrate metal at least 10 mm thick explosively bonded to a layer of cladding metal;

dividing the roll-bonded composite cladding assembly into a plurality of composite cladding elements each having a layer of substrate metal explosively bonded to a layer of cladding metal;

peripherally welding the layer of substrate metal of a composite cladding element to a coincident thicker third layer of substrate metal compatible for roll-bonding to the said second layer of substrate metal to form a composite cladding assembly;

heating the composite cladding assembly to a temperature above the bonding temperature of the metals of the said second and third layers; and passing the heated composite cladding assembly through pressure rolls to bond the substrate metal surface of the composite cladding element to the adjacent surface of the said third layer of substrate metal and simultaneously expand the area and reduce the thickness of the metal layers in the cladding assembly, thereby forming a clad metal element.

This preferred procedure is more economical than explosive bonding methods previously used because it combines inexpensive roll-bonding with the relatively expensive explosive bonding steps. Since the roll-bonding involved is limited to bonds between the like surfaces of the substrate metal only, no compatibility problems arise. A given area of explosive bond can conveniently produce 64 times that area of clad plate whereas in the aforementioned method involving explosive bonding and onward rolling method the area of clad metal was at most only 8 times the explosively bonded area. Consequently the costs for explosive bonding and transfer of metal to the explosive bonding site are much less.

A further advantage arising from the production of increased area of clad plate from a given area of explosive bond is enhanced uniformity in product quality as the variability of bond strength associated with the edge effects associated with explosive bonding is eliminated or substantially reduced.

The invention is further described, by way of example only, with reference to the accompanying drawings wherein.

Figure 1:
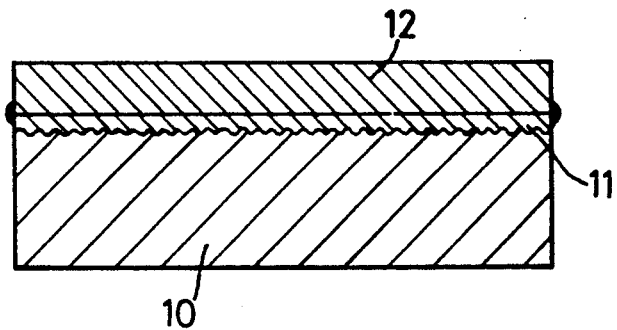
FIG. 1 shows in cross-section a side view of an assembly of an explosively bonded composite and a thicker layer of substrate metal before roll-bonding.

Referring to FIG. 1 an explosively bonded composite is prepared by explosively bonding a thin substrate metal layer (11) to a thick layer (10) of cladding (corrosion resistant) metal. A thick substrate metal plate (12) having similar areal dimensions to those of the composite is placed over the substrate metal layer (11) of the composite, the adjacent substrate metal surfaces being thoroughly cleaned, and the periphery of the plate (12) is fusion welded to the periphery of the layer (11). The prepared assembly is heated to a roll-bonding temperature and passed through a rolling mill until the layer (11) is bonded to the plate (12) at the interface, and the overall thickness reduced as shown in FIG. 2 to form a roll-bonded assembly (13) consisting of a layer (14) of cladding metal bonded to a layer 15 of substrate metal.

Figure 2:
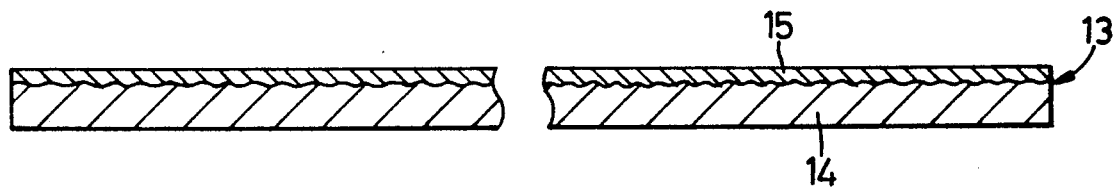
FIG. 2 shows in cross-section the assembly of FIG. 1 after roll-bonding.

The roll-bonded assembly (13) of FIG. 2 is divided into cladding elements (13A) each consisting of a layer of cladding metal (14) bonded to substrate metal layer (15).

Figure 3:
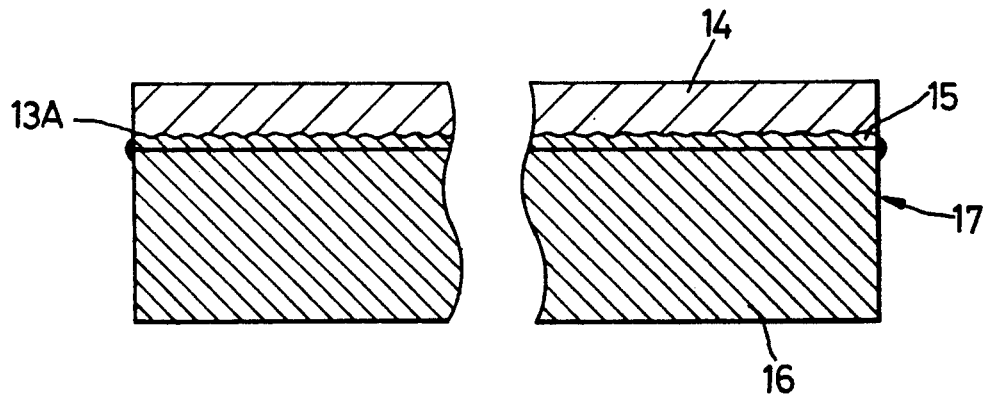
FIG. 3 shows in cross-section a cladding assembly consisting of a cladding element divided from the roll-bonded assembly of FIG. 2 and a thick layer of substrate metal before roll-bonding.
Figure 4:
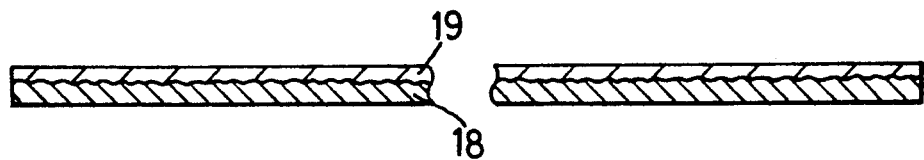
FIG. 4 shows in cross-section clad metal plate prepared by roll-bonding the assembly of FIG. 3.

Referring to FIG. 3 a single cladding element (13A) is placed over a thick substrate metal base (16) of similar areal dimensions, the substrate surface of the cladding element being adjacent to the surface of the substrate metal base (16). The base (16) is fusion welded to the layer (15) around the periphery of the interface and the resulting cladding assembly (17) is heated to a roll-bonding temperature and passed through the rolling mill until the layer (15) is bonded to the base (16) and the overall thickness of the assembly is reduced as shown in FIG. 4.

The invention is further illustrated by the following Example

EXAMPLE

An explosively bonded composite was prepared by explosively bonding a 10 mm thick carbon steel layer (11) to a 200 mm thick layer of titanium. A 70 mm thick carbon steel plate (12) having the same areal dimensions as the composite was placed over the steel layer (11), the adjacent steel surfaces having been thoroughly cleaned, and the periphery of the steel plate (12) was fusion welded to the periphery of the steel layer (11). The prepared assembly was heated to a temperature of 950°–1250° and passed through a rolling mill until the steel layer (11) was bonded to the steel plate (12) at the interface, the interface thereby being extinguished, and the overall thickness was reduced to 35 mm. The explosively bonded composite and the steel plate (12) initially were 2 meters long ×1.5 meters wide. After roll-bonding the bonded composite (13) was 8 meters long ×3 meters wide.

The roll-bonded composite (13) was divided into 8 cladding elements (13A) each 2 meters long ×1.5 meters wide and 35 mm thick and consisting of a 25 mm thick layer (14) of titanium bonded to a 10 mm thick substrate layer of steel (15).

A single cladding element (13A) was placed over a 115 mm thick carbon steel base (16) of similar areal dimensions, the steel surface of the cladding element being adjacent to the surface of the steel base (16) and both adjacent surfaces being thoroughly cleaned. The steel base (16) was fusion welded to the steel layer (15) around the periphery of the interface and the resulting cladding assembly (17) was heated to a temperature of 950°–1250° C. and passed through the rolling mill until the steel layer (15) was bonded to the steel base (16) and the overall thickness of the assembly was reduced to about 19 mm. The resulting clad plate was approximately 8 meters long ×3 meters wide and consisted of a thick layer (18) of steel about 16 mm thick bonded to a cladding layer (19) of titanium about 3 mm thick.

Thus the original 3 square meters area of explosively bonded composite produced 192 square meters of clad plate (18), the explosive bonding cost per square meter of the final clad metal plate being only about 1.6% of the cost per square meter of bonding the original explosively bonded composite.

I claim:

1. A method for producing a clad metal plate comprising the steps of:

metallurgically bonding a relatively thin first layer of a substrate metal to a relatively thick layer comprising an ingot or cladding metal to form a bonded composite element, said thin layer being sufficiently thick to ensure that the flow characteristics at a free substrate metal surface of the bonded composite element are not significantly modified by the cladding metal or ingot;

roll-bonding a relatively thick second layer of substrate metal to the free substrate metal surface of the bonded composite element to form a composite cladding element, the bonded composite element and the second layer of substrate metal being thinned and areally expanded in the roll-bonding step but leaving in the composite cladding element a sufficiently thick layer of substrate metal to ensure that the flow characteristics of the free substrate metal surface of the composite cladding element are not significantly modified by the cladding metal or ingot;

subdividing the composite cladding element into a plurality of subdivided composite elements each comprising a layer of substrate metal bonded to a layer of cladding metal or ingot; and roll-bonding a free surface of the second layer of substrate metal of each said subdivided composite cladding element to a relatively thick third layer of substrate metal to form a clad metal plate, the composite cladding element and the third layer of substrate metal being thinned and areally expanded in the roll-bonding step.

2. A method as claimed in claim 1 wherein the substrate metal is selected from the group consisting of carbon steel and stainless steel.

3. A method as claimed in claim 1 wherein the cladding metal is selected from the group consisting of titanium, zirconium, nickel and nickel alloys.

4. A method as claimed in claim 1 wherein the substrate metal is carbon steel and the cladding metal is stainless steel.

5. A method as claimed in claim 1 wherein the substrate metal layers each comprises carbon steel, the first layer of substrate metal being steel of lower carbon content than the second substrate layer.

6. A method as claimed in claim 1 wherein the said first layer of substrate metal is peripherally welded to the said second layer of substrate metal before the first roll-bonding step and the substrate metal layer of the said composite cladding element is peripherally welded to the said third layer of substrate metal before the second roll-bonding step.

7. A method as claimed in claim 1 wherein the said first layer of substrate metal and the layer of substrate metal of the said composite cladding element are each at least 10 mm thick.

8. A method as claimed in claim 1 wherein the step of metallurgically bonding the said first layer of substrate metal to the layer of cladding metal is effected by a process selected from the group consisting of electroplating, fusion bonding and explosive bonding.

9. A method according to claim 1 comprising the steps of:
- explosively bonding a first layer of substrate metal having a thickness of at least 10 mm to a relatively thicker coincident overlying layer of cladding metal to form a bonded composite element;
- peripherally welding the substrate metal of the bonded composite element to a coincident relatively thicker second layer of substrate metal compatible for roll-bonding to said first layer to form a composite assembly;
- heating the composite assembly to a temperature above the bonding temperature of the said substrate metals;
- passing the heated composite assembly through pressure rolls to bond the substrate metal surface of the explosively bonded composite element to the adjacent surface of the second layer of substrate metal and simultaneously expand the area and reduce the thickness of the metal layers thereby forming a roll-bonded composite cladding assembly having a layer of substrate metal at least 10 mm thick explosively bonded to a layer of cladding metal;
- dividing the roll-bonded composite cladding assembly into a plurality of composite cladding elements each having a layer of substrate metal explosively bonded to a layer of cladding metal;
- peripherally welding the layer of substrate metal of a composite cladding element to a coincident thicker third layer of substrate metal compatible for roll-bonding to the said second layer of substrate metal to form a composite cladding assembly;
- heating the composite cladding assembly to a temperature above the bonding temperature of the metals of the said second and third layers; and passing the heated composite cladding assembly through pressure rolls to bond the substrate metal surface of the composite cladding element to the adjacent surface of the said third layer of substrate metal and simultaneously expand the area and reduce the thickness of the metal layers in the cladding assembly thereby forming a clad metal element.

10. A method as claimed in claim 1 wherein the substrate metal surface of at least a portion of the clad metal plate formed in the second roll-bonding step is roll-bonded to a further layer of substrate metal and the roll-bonded assembly is thinned and expanded thereby reducing the thickness of the cladding metal layer.

* * * * *

UNITED STATES PATENT AND TRADEMARK OFFICE
CERTIFICATE OF CORRECTION

PATENT NO. : 5,271,546

DATED : December 21, 1993

INVENTOR(S) : Roy HARDWICK

It is certified that error appears in the above-indentified patent and that said Letters Patent is hereby corrected as shown below:

Column 3, line 65, replace "overlying" with --underlying--.

Column 7, line 10, claim 9, replace "overlying" with --underlying--.

Signed and Sealed this

Thirteenth Day of September, 1994

Attest:

BRUCE LEHMAN

Attesting Officer

Commissioner of Patents and Trademarks